United States Patent
Nghiem

[11] Patent Number: 5,407,577
[45] Date of Patent: Apr. 18, 1995

[54] BIOLOGICAL PROCESS TO REMOVE COLOR FROM PAPER MILL WASTEWATER

[75] Inventor: Nhuan P. Nghiem, San Jose, Calif.
[73] Assignee: Nalco Chemical Company, Naperville, Ill.
[21] Appl. No.: 80,933
[22] Filed: Jun. 22, 1993
[51] Int. Cl.⁶ .............................................. C02F 3/34
[52] U.S. Cl. ................................. 210/606; 210/611; 210/928; 435/278
[58] Field of Search ............... 210/606, 610, 611, 631, 210/928; 162/29, 30.1, 42, 43; 435/262.5, 278, 839

[56] References Cited

U.S. PATENT DOCUMENTS

| | | | |
|---|---|---|---|
| 4,199,444 | 4/1980 | Blair et al. | 210/11 |
| 4,266,035 | 5/1981 | Blair et al. | 435/253 |
| 5,091,089 | 2/1992 | Shen et al. | 210/611 |
| 5,178,762 | 1/1993 | Pokora et al. | 210/632 |
| 5,225,940 | 7/1993 | Nghiem | 435/168 |

OTHER PUBLICATIONS

Davis and Burns, "Decolorization of Phenolic Effluents by Soluble and Immobilized Phenol Oxidase", App. Microbio. & Biotec., Spring 1990, 721-26.

Ferrer et al., Decolorization of Kraft Effluent by Free & Immobilized Lignin Peroxidases and Horseradish Peroxidase, Biotech. Letters, vol. 13, No. 3, 577-82 (1991).

Nalco Prduct Bulletin, INOC TM 8161, "Bioaugmentation Cultures", 1990 Nalco Chemical Company, Naperville, IL. U.S.A.

Primary Examiner—Thomas Wyse
Attorney, Agent, or Firm—Robert A. Miller; James J. Drake; Paul D. Greeley

[57] ABSTRACT

A process for removing color from a pulp and paper wastewater which comprises the following steps: (A) treating the wastewater with an enzyme which is capable of oxidizing at least a portion of the color forming components of the wastewater; and (B) treating the wastewater subsequent to the enzyme treatment of step (A) with a tannin-degrading microorganism capable of degrading at least a portion of the oxidized color forming components.

19 Claims, 3 Drawing Sheets

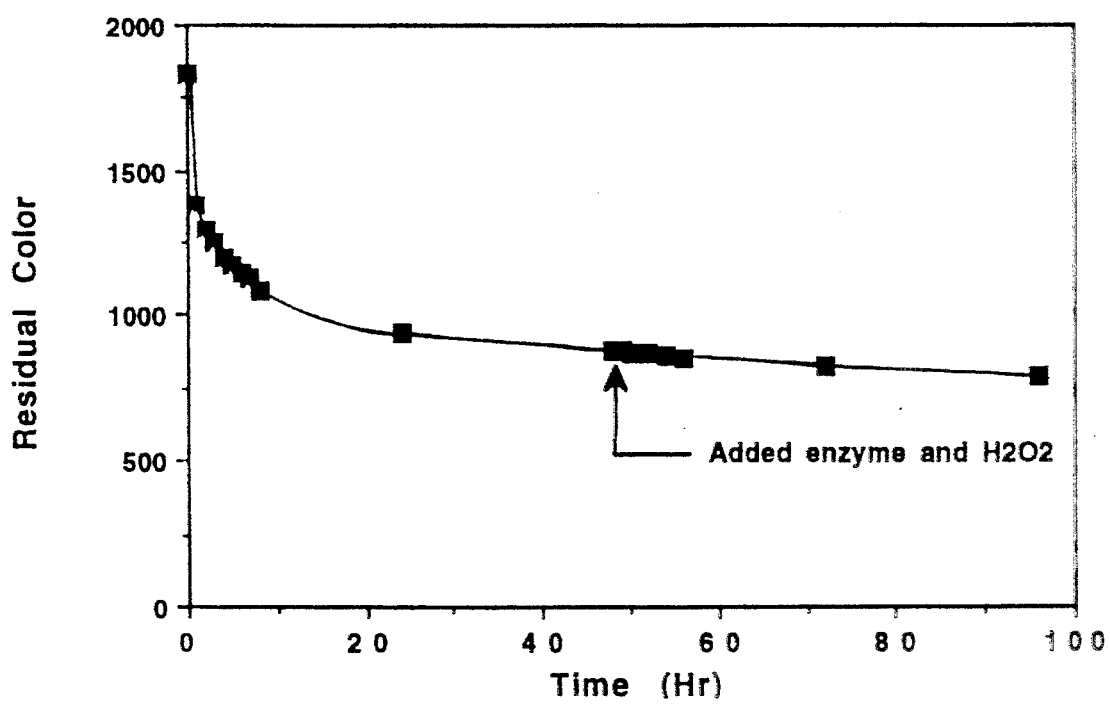
Figure 1. Removal of Color by Peroxidase

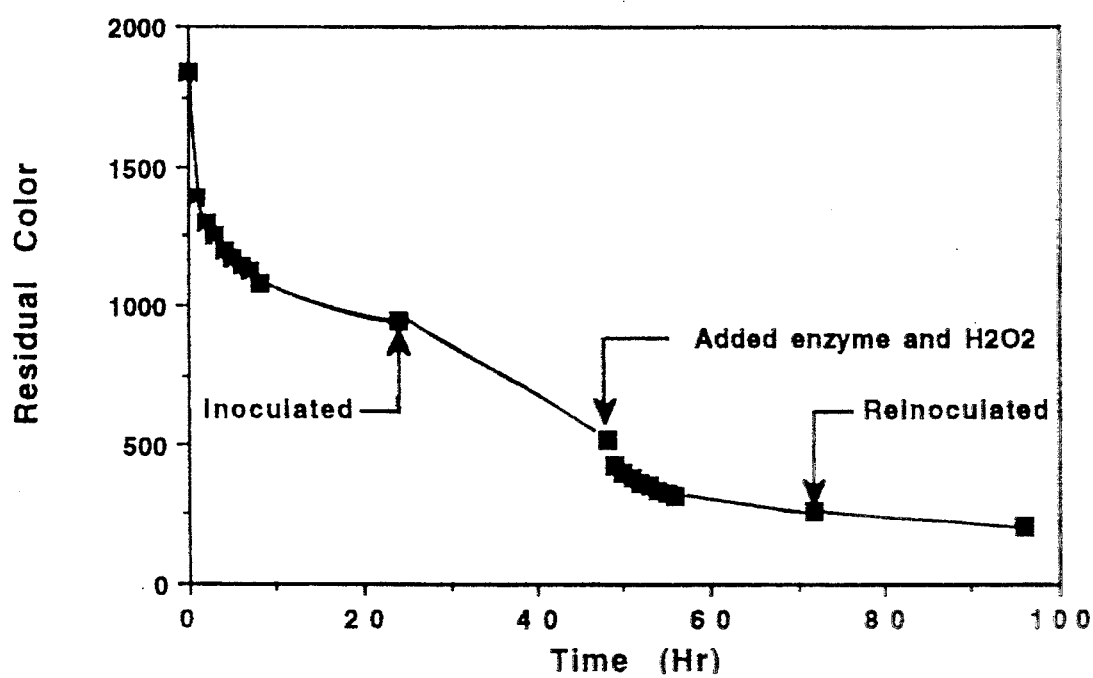
Figure 2. Removal of Color by Peroxidase and Tannin-Degrading Microrganisms

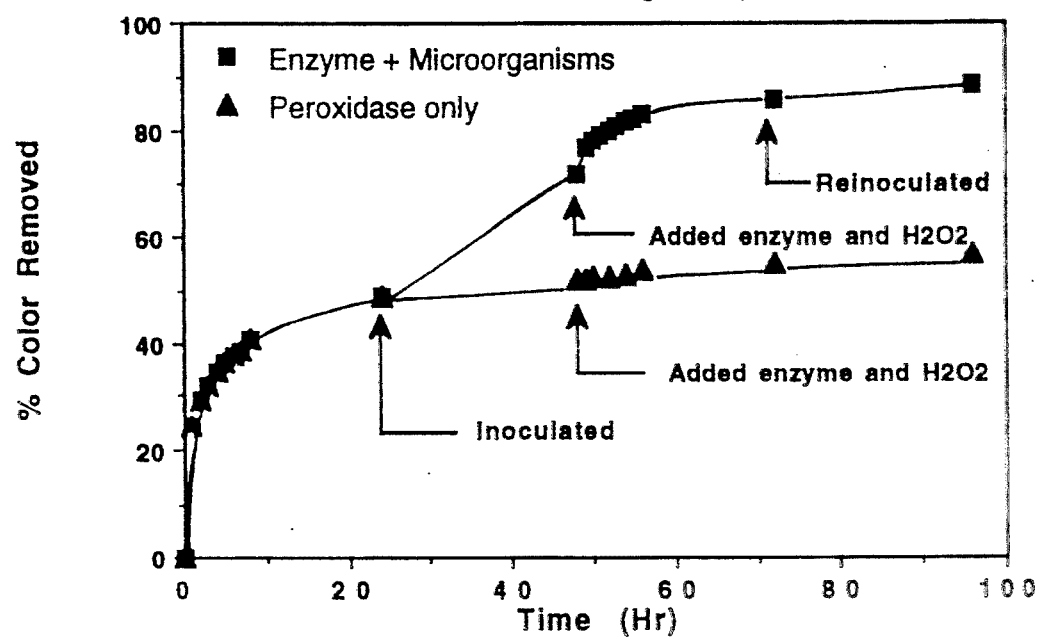
Figure 3. Comparison of Color Removal by Peroxidase and Peroxidase + Tannin-Degrading Microorganisms

BIOLOGICAL PROCESS TO REMOVE COLOR FROM PAPER MILL WASTEWATER

The present invention generally relates to a two-step process for removing color from pulp and paper wastewater. In particular, the process includes the treatment of wastewater with hydrogen peroxide and an enzyme which are capable of oxidizing color forming organic compounds, followed by treatment of the wastewater with a tannin-degrading microorganism which is capable of degrading the oxidized organic compounds to reduce feedback inhibition caused by high concentrations of the oxidized organic compounds. Both steps may be repeated as desired for color removal.

BACKGROUND OF THE INVENTION

Color removal from the effluent streams of paper mills continues to be a problem within the pulp and paper industry. It is necessary that these downstream wastewaters be treated for color removal prior to discharge into public waterways.

The United States wood pulp production capacity is approximately 60 million tons per year. Since the average cellulose content of wood is about 40%, 150 million tons of wood are needed to produce this 60 million tons of pulp. The difference between these two numbers represents the lignin and hemicellulose which must be removed or separated in the pulping process in order to free the cellulose fibers.

The pulping process, however, does not remove 100% of the lignin present in the wood, with approximately 5% remaining after either kraft or sulfite pulping (for mechanical pulping the amount is considerably higher). If a high grade paper is the desired end product, this 5% residual lignin must be removed, and is accomplished by bleaching the pulp.

Since over 35% of the pulp produced in the United States is bleached, there are about one million tons of lignin removed each year at the bleach plant, and most of this in the caustic extraction stage. This number is significant because in the removal process (i.e., bleaching), most of this residual lignin is solubilized. This solubilized lignin is a strong absorber of visible radiation resulting from the conjugation of unsaturated and quinoidal moieties formed during the oxidation step in the bleach plant. Consequently, the bleach plant effluent is highly colored. Although there are other sources of color in paper mill waste effluent, it is readily apparent that where bleaching is performed its effluent can be expected to be the major contributor of waste color. Indeed, at kraft, bleach mills the effluent from the first caustic extraction stage accounts for at least 70% of the waste color.

The goal of the pulping and bleaching operations is the removal of lignin and hemicellulose from the cellulose fiber in the wood. The 95% that is removed by pulping is often burned as fuel in the process of recovering the inorganic chemicals present in the black liquor. In the bleaching operation, the 5% residual lignin is separated from the fibers by degradation and solubilization and ends up in the wastewater. Chemical removal can, therefore, only be accomplished by reducing this solubility, which has proved to be a difficult task.

The process of color removal from the effluent stream is further complicated by the presence of lime, solid particulate matter like pulp, clay, dispersants/surface active materials and polymers used during various stages in the papermaking process. The solid particulate matter is commonly referred to as anionic trash.

Most governmental regulations pertaining to color removal from the effluent stream of a papermaking process are directed to true color, i.e., defined by the EPA/NCASI test as the absorbance of 465 mm of light by a sample adjusted to a pH of 7.6 and filtered through a 0.8 micrometer filter paper. Color is reported in standard color units (scu) which represents the concentration of a color standard solution producing an equivalent degree of absorbance (1 scu=1 mg/1 platinum as chloroplatinate). Nevertheless, there is increasing pressure on pulp and paper mills to lower the apparent color of the effluent water because that is the color visible to the naked eye as the effluent flows into public waterways. Apparent color is unfiltered and not pH adjusted, and results in part from particles that scatter light. There are occasions when the true color of a system that has undergone treatment is low, but the corresponding apparent color is high. This problem is commonly caused by the presence of suspended particulate matter that causes an increase in the turbidity of the system. Therefore, it is important that any new treatment for color removal should not only remove the true color of the effluent, but should also lower the apparent color as well.

The pressure to remove color comes primarily from state environmental agencies. Previously, it was thought that the discharge of colored waste affected only the aesthetic value of the receiving body of water; however, biologists are becoming increasingly concerned about possible toxic effects, the effect of reduced light transmittance through the water causing reduced levels of photosynthetic activity, and of course, the resultant drop in dissolved oxygen concentration because of this drop in activity. Furthermore, although these colored, waste products are fairly refractory towards biological oxidation and since they become degraded in the aquatic environment, the oxidation products may be potentially harmful.

It has been shown that by-products are water soluble, and that a significant amount is produced. This puts severe demands on chemicals to be used for color removal. There are techniques already available, however, that can remove greater than 90% of the color from either total mill effluent or isolated waste streams, such as from the caustic extraction stage of the bleach plant. These techniques include chemical (e.g., alum, ferric, lime or polyelectrolytes), biological (e.g., white rot fungus) and physical processes (e.g., ultrafiltration, ion exchange and carbon absorption). None enjoys widespread use because of unfavorable economics.

The demands on a product used in a color removal application are quite severe, i.e., the product must be capable of reacting with the color bodies in a manner which results in their becoming insoluble and, because of the extremely large amount of color bodies produced, the color removal product must work at very low weight ratios relative to the organics being removed or its use will be precluded by prohibitive costs.

A common problem associated with conventional chemical treatment methods, such as polymer made from epichlorohydrin/dimethylamine (Epi/DMA), is the fact that those polymers cannot lower the color of a system below a certain value beyond which they tend to re-disperse the color. This problem is commonly referred to as "overdosage."

In virtually all biological (i.e., non-enzymatic) color removal processes, white rot and other types of fungi are used. Although these fungi are very effective in removing color, they require acidic pH (about 5 or lower), an additional carbon source (e.g., glucose, sucrose, xylose, etc.), and/or attachment to an inert support. Maintaining the pH of the wastewater at about 5 or lower and the addition of a carbon source is expensive in terms of both additional chemicals and process equipment.

Some examples of biological color removal processes are set forth in U.S. Pat. Nos. 4,199,444 (Blair et al.), which issued on Apr. 22, 1980, and 4,266,035 (Blair et al.), which issued on May 5, 1981. Both patents relate to a process of decolorizing pulp and paper mill wastewater which involves the treatment of the wastewater effluent with a microbial strain of Pseudomonas aeruginosa under aerobic conditions. This particular microorganism requires the utilization of carbon-containing compounds for growth, e.g., glucose. The mutant strain Pseudomonas aeruginosa 4-5-14 can be employed alone or in combination with other microorganisms conventionally used in microbiological treatment of wastes. It also disclosed the use of any variants of Pseudomonas aeruginosa 4-5-14 alone or in combination.

Still others have used enzymes to remove color from pulp and paper wastewaters. The Ferrer et al. article, entitled "Decolorization of Kraft Effluent by Free and Immobilized Lignin Peroxidases and Horseradish Peroxidase", *Biotechnology Letters*, Vol. 13, No. 8, pp. 577–582 (1991), demonstrated that immobilized lignin peroxidase, horseradish peroxidase or lyophilized fungal cultures have a considerable potential for treatment of kraft effluent.

The article by Davis and Burns, "Decolorization of Phenolic Effluents by Soluble and Immobilized Phenol Oxidases", *Applied Microbiology and Biotechnology*, 1990, 32:721–726, discloses that horseradish peroxidase removed color from pulp mill, cotton mill hydroxide and cotton mill sulphide effluents, but rapid and irreversible enzyme inactivation took place. Peroxidase oxidize phenolics to aryloxy radicals, which spontaneously polymerize to form insoluble complexes; these can be removed by precipitation, filtration or centrifugation. Moreover, Davis and Burns disclosed that hydrogen peroxide concentration had a marked effect on the decolorizing ability of entrapped horseradish peroxidase (HRP) due to inactivation of the released enzyme. That is, the hydrogen peroxide acted to compensate for the HRP inactivation.

The present inventor has discovered through extensive observations that the peroxidase/$H_2O_2$ treatment system discussed above in the Davis and Burns article does not take into consideration the feedback inhibition on the enzyme during treatment of pulp mill wastewater effluents. This feedback inhibition on the enzyme that occurs during treatment prevents the color removal process from being carried out for a period of time sufficient to remove regulated amounts of color from the effluent.

In this regards, the present inventor has developed a two step treatment program that utilizes enzymes to oxidize the color forming organic compounds in the wastewater effluent and microorganisms to degrade the products of the enzymatic oxidation and, consequently, remove the feedback inhibition and re-activate the enzyme so that color removal can be carried out much further.

None of the conventional biological color removal processes known to the present inventor involve a two step process of treating a pulp or paper mill wastewater effluent with a phenol oxidase enzyme followed by a tannin-degrading microorganism.

The present invention also provides many additional advantages which shall become apparent as described below.

SUMMARY OF THE INVENTION

A process for removing color from a pulp and paper wastewater which comprises the following steps: (A) treating the wastewater with an enzyme which is capable of oxidizing at least a substantial portion of the color forming components of the wastewater; and (B) treating the wastewater subsequent to the enzyme treatment of step (A) with a tannin-degrading microorganism capable of degrading at least a substantially portion of the oxidized color forming components. Steps (A) and (B) may be repeated as necessary.

Step (A) preferably occurs in the presence of hydrogen peroxide, a source of nitrogen and/or a source of phosphorus.

The enzyme is preferably a phenol oxidase selected from the group consisting of: laccase, peroxidase and tyrosinase. However, any enzyme that is capable of oxidizing color forming components contained within pulp and paper wastewater effluent is contemplated hereby.

The preferred microorganism is a bacteria of Culture A (ATCC 55386), Culture B (ATCC 55385) or combinations thereof. However, any tannin-degrading microorganism that is capable of degrading the oxidized color forming components of pulp and paper wastewater effluent are also contemplated hereby and considered part of this invention.

This process may further include the step of maintaining conditions within the wastewater sufficient for the existence of the enzyme and microorganisms for a time period sufficient to at least reduce the concentration of color forming components within the wastewater.

A separation step may also be included within this process such that reaction products can be separated from the treated wastewater.

Other and further objects, advantages and features of the present invention will be understood by reference to the following specification in conjunction with the annexed drawings.

BRIEF DESCRIPTION OF THE DRAWINGS

FIG. 1 is a graph plotting residual color over time for treatment of pulp and paper wastewater with peroxidase;

FIG. 2 is a graph plotting residual color over time for treatment of pulp and paper wastewater with peroxidase followed by a tannin-degrading microorganism; and FIG. 3 is a graph comparing the percent color removal over time for treatment of pulp and paper wastewater with peroxidase only and peroxidase followed by a tannin-degrading microorganism.

DESCRIPTION OF THE PREFERRED EMBODIMENTS

The present invention is a novel two step treatment program for removing color from pulp and paper mill wastewater effluent. In the first step, the wastewater is treated with hydrogen peroxide and a phenol oxidase enzyme. The organic compounds which contribute to the wastewater color are oxidized to other compounds, resulting in a reduction in color. When these newly formed compounds accumulate in high concentrations, they exert a feedback inhibition on the enzyme, and the rate of oxidation becomes very slow. When this point is reached, the wastewater is treated with tannin-degrading microorganisms which are capable of degrading the compounds which are formed in the enzymatic treatment, and also other color-contributing compounds. Therefore, additional color reduction can be obtained by implementation of this microbial treatment step subsequent to the enzyme treatment step. When the compounds which are formed during the enzymatic treatment are degraded by the microorganisms, the feedback inhibition on the enzyme is lifted, and the rate of oxidation is increased over its pre-treatment levels, until the oxidation products accumulate to concentrations high enough to inhibit further enzymatic treatment/microbial treatment. This two-step treatment program can be repeated as many times as needed. Moreover, nitrogen and/or phosphorus can also be added to the wastewater as needed.

It is preferably to maintain the pH of the wastewater is in the range between about 5.0 to about 11.5. The temperature of wastewater is should be kept in the range between about 10° to 38° C.

ENZYMES

The general classification of enzymes useful in removing color by oxidation of organic bodies contained within pulp and paper mill wastewater effluents is phenol oxidases such as laccase, peroxidase, or tyrosinase. Laccase and peroxidase oxidize phenolics to aryloxy radicals, which spontaneously polymerize to form insoluble complexes that can be removed by precipitation, filtration or centrifugation. One particular peroxidase is horseradish peroxidase used with an oxidant, e.g., hydrogen peroxide, so as to facilitate the removal of aromatic amines and phenols from industrial effluents with concomitant removal of carcinogens. Horseradish peroxidase is active over a wide pH range and has been used to precipitate phenol from coal conversion effluents at pH 9.0.

The use of tyrosinase has been proposed as a less expensive alternative to horseradish peroxidase since it uses molecular oxygen as the oxidant instead of hydrogen peroxide.

Some examples of enzymes and their reagents are horseradish peroxidase (Type II) (donor: hydrogen peroxide oxidoreductase), mushroom tyrosinase ($O_2$: o-diphenyl oxidoreductase), pyrogallol (1,2,3-trihydroxybenzene) and guaiacol (o-methoxyphenol).

Laccase can be prepared from shaken cultures of C.versicolor UKC, grown on malt extract medium plus 5.0 gl$^{-1}$ glucose and induced at day 7 with 2,5-xylidine. After 14 days laccase is precipitated from the culture medium with 80% saturation $(NH_4)_2SO_4$, the precipitate re-dissolved in 0.01M acetate buffer pH 5.0, and dialyzed against buffer for 48 hours at 4° C. The dialysate is frozen at −20° C., thawed, and laccase solution squeezed from the resulting polysaccharide matrix.

The enzyme is preferably added to the wastewater in an amount between about 0.1 to about 6.0 units/ml, more preferably about 0.1 to about 3.0 units/ml (one unit will form 1.0 mg of purpurogallin from pyrogallol in 20 seconds at a pH of 6.0 at 20° C.). The purpurogallin (20 sec.) unit is equivalent to approximately 18 $\mu M$ units per minute at 25° C.

MICROORGANISMS

The microorganism that may be used to re-activate the enzyme and reduce feedback inhibition in accordance with the two-step treatment program of the present invention is preferably any tannin-degrading microorganism capable of degrading the oxidized reaction products formed from the enzymatic treatment of the pulp and paper wastewater effluent, and also other color-contributing compounds.

In a preferred embodiment of the invention, a mixed culture (Culture A) is added to the pulp and paper wastewater effluent which has been previously treated with an enzyme capable of oxidizing the organic and color producing compounds contained therein. This mixed culture was isolated from a soil sample which contained partially degraded leaves and grass, and is described in more detail below under its "Culture A" designation.

In a further preferred embodiment, the bacteria species, or one of them, which is added to the enzyme treated wastewater is *Bacillus subtilis*. A pure culture of this species is employed in the below examples, under the designation of "Culture B". The pure culture of Culture B was isolated from Culture A as will be describe in more detail hereafter.

CULTURE A

Culture A is a mixed culture isolated from a soil sample which contained partially degraded leaves and grass. The microorganism, or at least a portion of them, could grow on tannin as the sole carbon source. A species that is very active in the process of the present invention was isolated from Culture A and is designated herein, as a pure culture, as "Culture B" discussed below. A deposit of Culture A has been made to American Type Culture Collection, 12301 Parklawn Drive, Rockville, Md. 20852, USA, and given the identifying deposit number of ATCC 55386.

CULTURE B

Culture B is a pure culture of the bacteria species *Bacillus subtilis*. This is one of the tannin-degrading microorganism isolated from the mixed culture of Culture A. Bacillus subtills is within the genera Bacillus, all species of which are chemoorganotrophic. *Bacillus subtilis* is a gram-positive, catalase-positive, motile bacilli, which does not grow in glucose broth under anaerobic conditions. It reduces nitrate to nitrite, and forms acid, but not gas, from glucose, arabinose and mannitol. A deposit of Culture B has been made to American Type Culture Collection, 12301 Parklawn Drive, Rockville, Md. 20852, USA, and given the identifying deposit number of ATCC 55385.

A suitable minimum population of bacteria may be about $10^5$ to about $10^8$ unit/ml, more preferably about $10^6$ to about $10^8$ units/ml. The population that is desirable is one that does not unduly delay the process by necessitating a long time period for cell growth before the rate of enzymatic oxidation of the color bodies is increased versus its non-treated rate, and yet is not excessively high.

A wide variety of conventional techniques for the separation of solids from liquids are known, and may in instances be used in conjunction with the process of the present invention. For instance, the processes of coagulation and flocculation are available for the separation of suspended solids from water when the natural subsidence rates of such solids are slower than desirable. Filtration, or sedimentation plus filtration, is a well known solids separation technique, which at times is used together with chemical aids. Air flotation clarification is another solids separation technique that may employ chemical aids, such as coagulants or flocculants. The process of the present invention does not exclude the use of such conventional solids/liquids separation techniques, particularly when employed to increase the rate at which the oxidized compounds are removed from the wastewater being treated. Nonetheless the present process alone may suffice for the reduction of oxidized compound concentration in the wastewater system, the oxidized compounds being reduced in the sense that insoluble species of such compounds are formed and gravitate to a sludge fraction.

The process of the present invention is also not limited to a batch type process, but instead may be used in a dynamic or continuous system, the enzyme and bacteria species being replenished as necessary.

EXAMPLE 1

(Effect of pH on the Activity of Peroxidase)

The wastewater used in this example was an alkaline sewer effluent from a Southeast United States paper mill having a pH of 11.25 and a color of 1837 scu. 25 mg of a P-8000 horseradish peroxidase, sold by Sigma Chemical Company, was dissolved in 500 ml of wastewater. 0.57 ml of 30% $H_2O_2$ was added to the enzyme treated wastewater resulting in a concentration of 10 mM. 50 ml of this mixture was delivered to five 250 ml flasks (i.e., Samples 1–5). The pH of each flask was adjusted to 11.0, 10.0, 9.0, 8.0 and 7.0, respectively, with 1N and 0.1N $H_2SO_4$. Thereafter, each flask was incubated in a shaker at 100 rpm and 30° C. for 24 hours.

Samples 6–10 were prepared in accordance with the above procedure, except that the $H_2O_2$ concentration was 20 mM.

The results of color removal based upon the above treatment with horseradish peroxidase and $H_2O_2$ are set forth below in Table 1:

TABLE 1

| Sample No. | $H_2O_2$ (mM) | pH | Final Color | % Color Removed |
| --- | --- | --- | --- | --- |
| 1 | 10 | 11 | 979 | 46.7 |
| 2 | 10 | 10 | 1005 | 45.3 |
| 3 | 10 | 9 | 1058 | 42.4 |
| 4 | 10 | 8 | 1106 | 39.8 |
| 5 | 10 | 7 | 1130 | 38.5 |
| 6 | 20 | 11 | 825 | 55.1 |
| 7 | 20 | 10 | 928 | 49.5 |
| 8 | 20 | 9 | 964 | 47.5 |
| 9 | 20 | 8 | 1075 | 41.5 |
| 10 | 20 | 7 | 1115 | 39.3 |

The results show that the enzyme horseradish peroxidase is effective over quite a wide pH range. Since it was most effective at high pH, the pH of the alkaline sewer effluent will not have to be adjusted before enzymatic treatment.

EXAMPLE 2

(Enzymatic vs. Enzymatic/Microbial Treatments)

The wastewater used in this example was an alkaline sewer effluent from a Southeast United States paper mill having a pH of 11.25 and a color of 1837 scu. 100 mg of P-8000 horseradish peroxidase, sold by Sigma Chemical Company, was dissolved in 2 liters of wastewater. 2.26 ml of 30% $H_2O_2$ was added to the enzyme treated wastewater resulting in a concentration of 10 mM. No adjustment was made for alkaline pH of effluent. The treated wastewater was transferred into a 2 liter flask and closed with a rubber stopper. The flask was placed in a 30° C. water bath and mixed with a magnetic stir bar. The results of the horseradish peroxidase and $H_2O_2$ treatment are set forth below in Table 2.

TABLE 2

| Time (hr) | Residual Color | % Color Removed |
| --- | --- | --- |
| 0 | 1837 | 0 |
| 1 | 1387 | 24.5 |
| 2 | 1297 | 29.4 |
| 3 | 1253 | 31.8 |
| 4 | 1198 | 34.8 |
| 5 | 1169 | 36.4 |
| 6 | 1141 | 37.9 |
| 7 | 1129 | 38.5 |
| 8 | 1085 | 40.9 |
| 24 | 942 | 48.7 |

At 24 hours, 900 ml of the enzyme treated wastewater was transferred into each of two 1 liter flasks. A tannin-degrading microorganism (Culture B) was added to flask #1, together with 0.5 grams of $NH_4Cl$, 0.3 grams of $KH_2PO_4$ and 1 ml of a trace metal stock solution. Thereafter, the flask was placed in a 35° C. water bath. The flask was aerated and mixing was provided by a magnetic stir bar.

Nothing was added to flask #2. This flask was placed in a 30° C. water bath. Since this water bath could not be placed on a magnetic stirrer, mixing was provided by shaking every 30 minutes for eight hours, then the experiment was continued without mixing for the next 16 hours. The results are set forth in Table 3 below:

TABLE 3

| Flask # | Residual Color | % Color Removed |
| --- | --- | --- |
| 1 | 518 | 71.8 |
| 2 | 882 | 52.0 |

(Note: In Flask #1, water was added to compensate for evaporation loss before color measurement was taken)

The results show that significant color was removed by the microbial treatment following the enzymatic treatment.

At 48 hours (total time), 50 mg of peroxidase and 1.13 ml of 30% $H_2O_2$ were added to both flasks. The flasks were then placed in a 30° C. water bath. (This water bath was the 35° C. water bath used in the microbial treatment experiment described above which was reset to 30° C. for the second enzymatic treatment experiment described above). Mixing was provided with magnetic stir bars. The results are set forth below in Tables 4 and 5.

TABLE 4

| | (Flask #1) | |
| --- | --- | --- |
| Time (hr) | Residual Color | % Color Removed |
| 48 | 518 | 71.8 |
| 49 | 427 | 76.8 |
| 50 | 398 | 78.3 |
| 51 | 380 | 79.3 |
| 52 | 365 | 80.1 |
| 53 | 351 | 80.9 |
| 54 | 338 | 81.6 |
| 55 | 328 | 82.1 |
| 56 | 315 | 82.9 |

TABLE 4-continued (Flask #1)

| Time (hr) | Residual Color | % Color Removed |
|---|---|---|
| 72 | 263 | 85.7 |

The results from flask #1 demonstrate that the rate of enzymatic color removal increased subsequent to the addition of new enzyme and $H_2O_2$ following the treatment with the tannin-degrading microorganism (Culture B).

TABLE 5

(Flask #2)

| Time (hr) | Residual Color | % Color Removed |
|---|---|---|
| 48 | 882 | 52.0 |
| 49 | 878 | 52.2 |
| 50 | 875 | 52.4 |
| 52 | 870 | 52.6 |
| 54 | 863 | 53.0 |
| 56 | 852 | 53.6 |
| 72 | 825 | 55.1 |

The results from flask #2 demonstrate that without treatment with microorganisms following the initial enzymatic degradation of the color bodies in the wastewater, the rate of enzymatic color removal remains very low even with the addition of new enzyme and $H_2O_2$.

At 72 hours (total time), flask #1 was re-inoculated with the tannin-degrading microorganism (Culture B) and placed in the 35° C. water bath, mixed and aerated as described above. However, nutrients such as $NH_4Cl$, $KH_2PO_4$ and trace metal stock solution were not added. Flask #2 was placed in the 30° C. water bath with intermittent mixing as described above. Both experiments were carried out for 24 hours. The results after a total time of 96 hours are set forth below in Table 6.

TABLE 6

| Flask # | Residual Color | % Color Removed |
|---|---|---|
| 1 | 212 | 88.5 |
| 2 | 793 | 56.8 |

The results showed that still more color was removed by the second microbial treatment with the tannin-degrading microorganism (Culture B).

The overall results from Tables 2-6 are set forth in FIGS. 1-3, attached hereto. FIG. 1 depicts the residual color removal by successive additions of peroxidase and $H_2O_2$ without microbial addition. FIG. 2 depicts the residual color removal by successive addition of (1) peroxidase and $H_2O_2$, (2) Culture B, (3) peroxidase and $H_2O_2$, and (4) Culture B. FIG. 3 is a comparison of the percent color removal exhibited by (A) successive additions of peroxidase and $H_2O_2$ without microbial addition, and (B) successive addition of peroxidase and $H_2O_2$, Culture B, peroxidase and $H_2O_2$, and Culture B.

EXAMPLE 3

(Effect of Additional Carbon Source on Microbial Treatment)

The wastewater used in this example was an aeration basin effluent from another Southeast United States paper mill having a pH of 7.13 and a color of 1468 scu. 30 mg of peroxidase was dissolved in 200 ml of wastewater. 0.2 ml of 30% $H_2O_2$ was added to the enzyme treated wastewater. The treated wastewater was transferred to a 250 ml flask. The flask was placed in a 30° C. water bath and mixed with a magnetic stir bar. The results of the peroxidase and $H_2O_2$ treatment are set forth below in Table 7.

TABLE 7

| Time (hr) | Residual Color | % Color Removed |
|---|---|---|
| 0 | 1468 | 0 |
| 2.5 | 1115 | 24.0 |
| 4 | 1010 | 31.2 |
| 6 | 993 | 32.4 |
| 21.5 | 718 | 51.1 |

25 ml of enzyme treated wastewater was transferred to each of six 250 ml flask which were all inoculated with a tannin-degrading microorganism (Culture B) and other components as follows:

| Sample 1 | Culture B only |
| Sample 2 | Culture B + Trace Metals (TM) |
| Sample 3 | Culture B + TM + N (0.98 g/l $NH_4Cl$) + P (0.56 g/l $KH_2PO_4$) |
| Sample 4 | Culture B + Glucose (2 g/L) |
| Sample 5 | Culture B + Glucose + TM |
| Sample 6 | Culture B + Glucose + TM + N + P |

The flasks were then incubated in a shaker at 35° C. and rpm for 24 hours. The results are set forth in Table 8 below.

TABLE 8

| Sample No. | Residual Color | % Color Removed |
|---|---|---|
| 1 | 726 | 50.5 |
| 2 | 681 | 53.6 |
| 3 | 423 | 71.2 |
| 4 | 698 | 52.5 |
| 5 | 679 | 53.7 |
| 6 | 483 | 67.1 |

The results from Samples 1-6 demonstrate that nitrogen, phosphorus and trace metals increase the percent color removal from the wastewater. Glucose as an additional carbon source was not needed since it did not substantially charge the percent color removal from the wastewater.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A process for removing color from a pulp and paper wastewater which comprises the following steps:
   (A) treating said wastewater with an enzyme which is capable of oxidizing at least a portion of the color forming components of said wastewater; and
   (B) treating said wastewater subsequent to the enzyme treatment of step (A) with a tannin-degrading microorganism capable of degrading at least a portion of the oxidized color forming components.

2. The process according to claim 1 wherein steps (A) and (B) are repeated as necessary.

3. The process according to claim 1 further comprising the addition of sources of nitrogen and/or phosphorus to said wastewater.

4. The process according to claim 1 wherein the pH of said wastewater is in the range between about 5.0 to about 11.5.

5. The process according to claim 1 wherein the temperature of said wastewater is in the range between about 10° to 38° C.

6. The process according to claim 1 wherein said enzyme is a phenol oxidase.

7. The process according to claim 6 wherein said phenol oxidase is selected from the group consisting of: laccase, peroxidase and tyrosinase.

8. The process according to claim 7 wherein said peroxidase is horseradish peroxidase.

9. The process according to claim 8 further comprising the addition of hydrogen peroxide to said enzyme treatment step (A).

10. The process according to claim 7 wherein said tyrosinase is mushroom tyrosinase.

11. The process according to claim 7 wherein said laccase is prepared from cultures of C.versicolor.

12. The process according to claim 1 wherein said microorganism is a bacteria of Culture A (ATCC 55386), Culture B (ATCC 55385) or combinations thereof.

13. The process according to claim 1 wherein said enzyme is added to said wastewater in an amount between about 0.1 to about 6.0 units/ml.

14. The process according to claim 13 wherein said enzyme is added to said wastewater in an amount between about 0.1 to about 3.0 units/ml.

15. The process according to claim 1 wherein said microorganism is added to the enzyme treated wastewater in an amount between about $10^5$ to about $10^8$ units/ml.

16. The process according to claim 15 wherein said microorganism is added to the enzyme treated wastewater in an amount between about $10^6$ to about $10^8$ units/ml.

17. The process according to claim 1 further comprising a step for separating solids from liquids.

18. The process according to claim 17 wherein said step for separating solids from liquids is selected from the group consisting of coagulation, flocculation, filtration, sedimentation plus filtration, and air flotation clarification.

19. The process according to claim 1 further comprising the step of maintaining conditions within said wastewater sufficient for the existence of said enzyme and said microorganism for a time period sufficient to at least reduce the concentration of color forming components within said wastewater.

* * * * *